United States Patent
Kotzin et al.

(10) Patent No.: US 6,470,180 B1
(45) Date of Patent: *Oct. 22, 2002

(54) EXPLOITING A BROADCAST SYSTEM TO ENHANCE A WIRELESS GAMING EXPERIENCE

(75) Inventors: Michael D. Kotzin, Buffalo Grove, IL (US); Howard J. Thomas, Cirencester (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/638,182

(22) Filed: Jul. 31, 2000

(51) Int. Cl.[7] ............................................. H04M 11/10
(52) U.S. Cl. ...................... 455/412; 455/414; 463/40; 463/41
(58) Field of Search ................. 455/412, 414, 455/411, 426, 456, 463, 466, 517, 458; 340/323 R; 463/39, 41, 42, 40

(56) References Cited

U.S. PATENT DOCUMENTS

| | | | |
|---|---|---|---|
| 5,392,452 A | * 2/1995 | Davis | 340/7.3 |
| 5,651,010 A | 7/1997 | Kostreski et al. | |
| 5,682,404 A | 10/1997 | Miller | |
| 5,729,549 A | 3/1998 | Kostreski et al. | |
| 5,738,583 A | 4/1998 | Comas et al. | |
| 5,822,324 A | 10/1998 | Kostresti et al. | |
| 5,845,203 A | * 12/1998 | LaDue | 455/414 |
| 5,903,735 A | * 5/1999 | Kidder et al. | 370/233 |
| 5,999,808 A | * 12/1999 | LaDue | 455/412 |
| 6,011,548 A | 1/2000 | Thacker | |
| 6,026,360 A | 2/2000 | Ono | |
| 6,321,383 B1 | * 11/2001 | Funahashi et al. | 725/92 |
| 6,383,077 B1 | * 5/2002 | Kweitko et al. | 463/40 |
| 6,416,414 B1 | * 7/2002 | Stadelmann | 463/42 |

OTHER PUBLICATIONS

U.S. patent application Ser. No. 09/629,633, Thomas et al., filed Jul. 31, 2000.

* cited by examiner

Primary Examiner—Dwayne Bost
Assistant Examiner—Sonny Trinh
(74) Attorney, Agent, or Firm—Hisashi David Watanabe; Roland K. Bowler, II

(57) ABSTRACT

A wireless data system (200) and a method (300) of communicating digital data to a handheld wireless device (202) are provided. The wireless data system (200) includes a plurality of handheld wireless devices (202) capable of receiving digital data comprised of a first digital data portion and at least one second digital data portion. The wireless data system (200) also includes a wireless network (209) capable of transmitting (318) the first digital data portion to the plurality of handheld wireless devices (202), a data server (212) for creating the digital data, the data server capable of communicating with the wireless network, and at least one broadcast transmitter (215) communicating with the data server, the at least one broadcast transmitter broadcasting (321) the at least one second digital data portion to the plurality of handheld wireless devices. The plurality of handheld wireless devices (202) are capable of receiving and combining (323) the first digital data portion and the at least one second digital data portion.

26 Claims, 2 Drawing Sheets

EXPLOITING A BROADCAST SYSTEM TO ENHANCE A WIRELESS GAMING EXPERIENCE

BACKGROUND OF THE INVENTION

1. Field of the Invention

The present invention relates generally to a wireless digital data transfer, and more particularly to a wireless digital data transfer that exploits a broadcast system to enhance a wireless gaming experience.

2. Description of the Background Art

Wireless networks are used to transmit digital data both through wires and through radio links. Examples of a wireless network are cellular telephone networks, pager networks, etc. Such wireless networks may include land lines, radio links and satellite links, and may be used for purposes such as cellular phone systems, Internet systems, computer networks, pager systems and other satellite systems. Such wireless networks are becoming increasingly popular and of increasingly higher capacity. Much information and data is transmitted via wireless networks, and they are becoming a common part of people's business and personal lives. As people use them in greater and greater numbers, these networks have been forced to grow in both size and capacity.

One aspect of wireless digital networks that has been growing rapidly is gaming. Network gaming may consist of one or more players communicating with other players or computer systems to conduct a game. These network gaming systems may encompass simulations, gambling games, interactive games, fantasy games, role playing, combat games, adventure games, etc. The popularity is growing as computer systems and computer software for such games increases in complexity and realism. Therefore, the demand for such gaming systems has increased.

The transfer of digital data includes the transfer of text, audio, and graphical data. A user may interactively acquire the data (i.e., by sending commands or requests, such as in a game), or in a more passive manner (simply accepting and using or storing the data).

In addition to gaming, this data may have a wide variety of uses, including simulations, data sharing, skills measuring or performance testing, coordinated viewing, etc.

Wireless networks have also brought about a change in devices that communicate the data. A wide variety of handheld wireless devices have been developed along with wireless networks. Such handheld wireless devices include, for example, cellular phones, pagers, radios, personal digital assistants (PDAs), notebook or laptop computers incorporating wireless modems, mobile data terminals, application specific gaming devices, video gaming devices incorporating wireless modems, etc.

To address this increasing demand for gaming, one increasingly popular alternative has been the use of wireless networks that use radio frequency (RF) transmission. For example, using wireless devices, people can participate in a gaming experience on trains, buses, taxis, in motels, restaurants, away from home, in the backyard, on the patio, etc. Therefore, there has been increasing demand for digital network gaming that can be played using both conventional land-based links and wireless networks.

FIG. 1 shows a typical prior art cellular network 100 used for gaming. This may include a cellular network 111, a gaming server 116 connected to the cellular network 111, and one or more base stations 105 connected to the cellular network 111. The base stations 105 may communicate with a plurality of devices 101. One example of such a network used for gaming is given in U.S. Pat. No. 5,738,583 to Comas et al.

A large drawback of the prior art is inadequate bandwidth. The bandwidth of digital data link determines how much data can flow through it. The wireless network bandwidth is, of course, chosen to accommodate digitized audio signals, which do not require a large amount of bandwidth. Narrow bandwidth is a problem where graphics and video data need to be transmitted, because graphical and video data require a large amount of bandwidth (most games employ some kind of graphics and/or video). Conventional wireless networks therefore have been insufficient in performance for applications requiring transfer of large quantities of data, especially gaming data. Prior art wireless networks give a sluggish performance and unsatisfactory game play. Users want their games, or any kind of digital data download, to be as fast as they can assimilate and process the data. Users do not want to wait for data to arrive, do not want jerky images, long downloading times, and graphics that don't change as needed.

What is needed, therefore, is an improved digital data transfer method and apparatus for conducting a digital data transfer over a wireless network.

DETAILED DESCRIPTION OF THE PREFERRED EMBODIMENTS

The present invention has been developed to address drawbacks in the prior art due to limited bandwidth and the resulting inferiority in digital data transfer and/or inferior game play. The present invention addresses the need for larger bandwidth capability for conducting data transfer over a wireless network, and more specifically, the need for an improved gaming experience. The present invention addresses this need by supplementing the data delivery capability of a wireless network.

Figure 1:
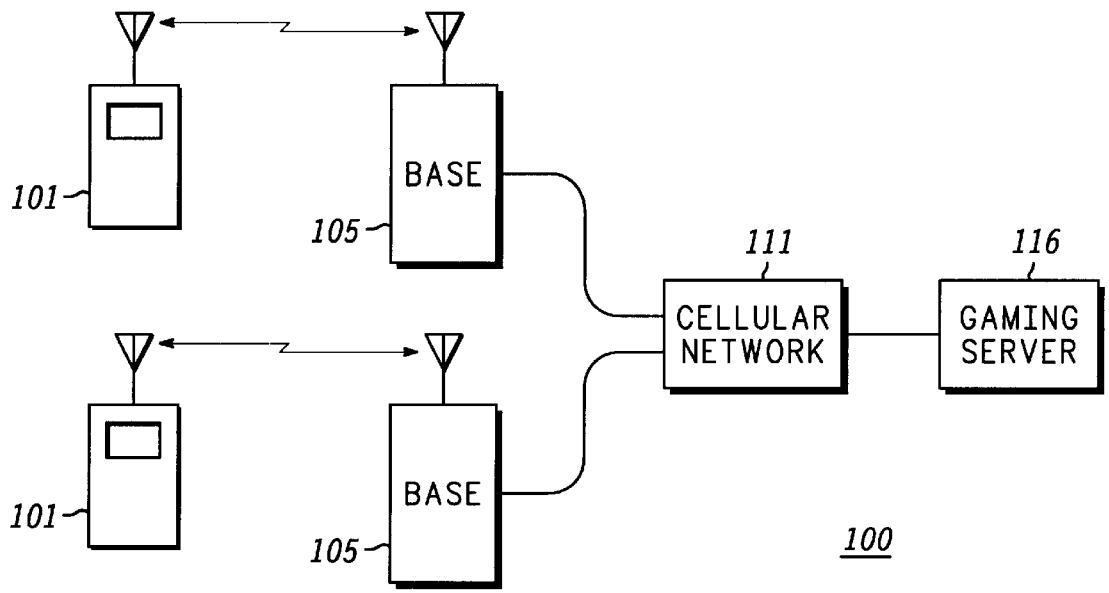
FIG. 1 shows a typical prior art cellular network used for gaming.
Figure 2:
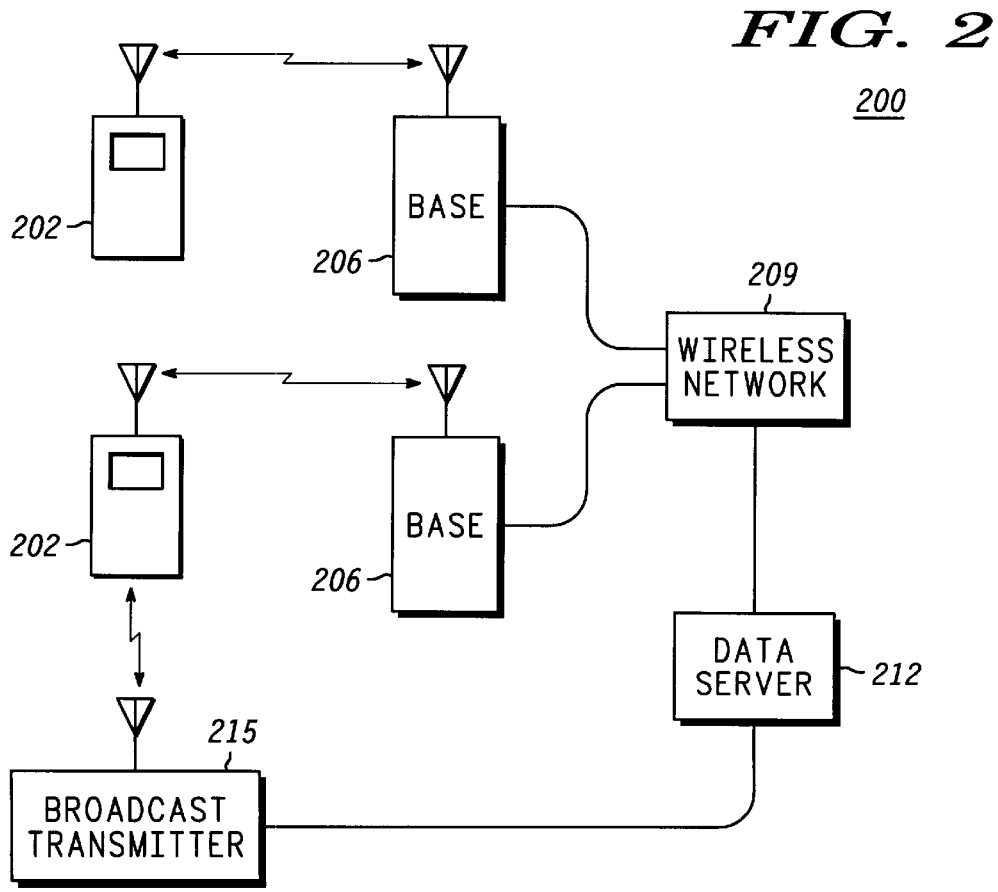
FIG. 2 shows a wireless data system of the present invention.

FIG. 2 shows a wireless data system 200 of the present invention. Included in the wireless data system 200 is a wireless network 209, a data server 212 (such as, for example, a gaming server), a plurality of base stations 206, a plurality of handheld wireless devices 202, and a broadcast transmitter 215.

A handheld wireless device 202 may include, for example, cellular phones, pagers, radios, personal digital assistants (PDAs), notebook or laptop computers incorporating wireless modems, mobile data terminals, application specific gaming devices, video gaming devices incorporating wireless modems, etc.

The data server 212 is connected to the wireless network 209. The data server 212 may provide gaming information to the wireless network 209 (or any other type of information, but especially high-bandwidth information such as videos or graphics). The data server 212 may generate the game visuals, backgrounds, characters, audio, movements, general data, etc., to transmit to the users through the wireless network 209.

The wireless data system 200 of the present invention also includes the broadcast transmitter 215 which is connected to the data server 212. Therefore, the data server 212 may split up the data going to the handheld wireless devices 202 and may send only part of the information through the wireless network 209. The digital data may be divided into two or more data portions, with a first data portion being transmitted to the plurality of handheld wireless devices 202 through the wireless network 209. The other portion or portions may be broadcast to the plurality of handheld wireless devices 202 through one or more broadcast transmitters 215.

Both the first and second data portions are used for a particular application of the handheld wireless device 202, such as for example a video game, video conferencing and the like. Therefore, the first and second data portions must relate to each other. Each handheld wireless device 202 includes a screen 218 to display at least a portion of the first data portion and at least a portion of the second data portion simultaneously. For example, the second data portion may provide a visual background for the screen 218, and the first data portion may provide a visual foreground that overlays the visual background on the screen. In another example relating to a video game, a room setting may be commonly displayed on the screen 218 to one or more players. The room itself may not change, and only a game player's perspective within the room changes. The room data may therefore be created as a block of data elements within the gaming data that is separately broadcast by the broadcast transmitter 215.

The data may be created in different ways. In a preferred embodiment, the data, such as a video game data, may be created as partitioned data, wherein common or repetitive data elements may be segregated, marked, or identified in some manner. Alternatively, the data may be such that it is easily recognized by the data server 212 and separately transmitted (i.e., character data may be distinguishable from scenery data, etc.).

In a further refinement of the present invention, the broadcast data may be transmitted independently of a need for the broadcast data, i.e., in a non-concurrent fashion. In this manner, common or repetitive data may be broadcast in advance. The broadcast data may therefore be stored or held in a handheld wireless device 101 and used when needed. This may include, for example, an on-line game subscription wherein at sign-up a user may receive game scenery, etc., and store it for future use. The stored data may be triggered at a later time, and may be triggered multiple times.

The bandwidths of the transmission from a broadcast transmitter 215 to the plurality of handheld wireless devices 202 may therefore be selected to supplement the bandwidth of the wireless network 209.

As previously discussed, the wireless network 209 may be a cellular network or may be other types of networks, such as, for example, a pager network, or a computer network of some sort. Any one of these digital networks may included in or connected to the Internet or networks such as a local area network (LAN), wide area network (WAN), virtual private network (VPN), etc.

The linkages between the wireless network 209, the data server 212, and the at least one broadcast transmitter 215 may be through a dedicated wire line, through a phone line, through an RF link, etc.

The broadcast transmitter 215 may transmit any desired portion of a gaming data to the handheld wireless devices 202 via one or more independent linkages, such as, for example, an independent RF transmission link to the handheld wireless devices 202. The broadcast transmitter 215 may be a land-based transmitter or may be a satellite-based transmitter.

The broadcast transmitter 215 may use any available broadcast format or modulation, including but not limited to amplitude modulation (AM), frequency modulation (FM), phase modulation, TV broadcast format, etc. In addition, the broadcast transmitter 215 may use any available channel format or access format, such as time division multiple access (TDMA), frequency division multiple access (FDMA), code division multiple access (CDMA), Bluetooth, etc. It should be understood that the broadcast transmitter 215 may or may not conform to existing broadcast standards.

Of course, it should be noted that the handheld wireless devices 202 may be capable of not only receiving data from the wireless network 209 or the broadcast transmitter 215, but may also be capable of sending data.

Figure 3:
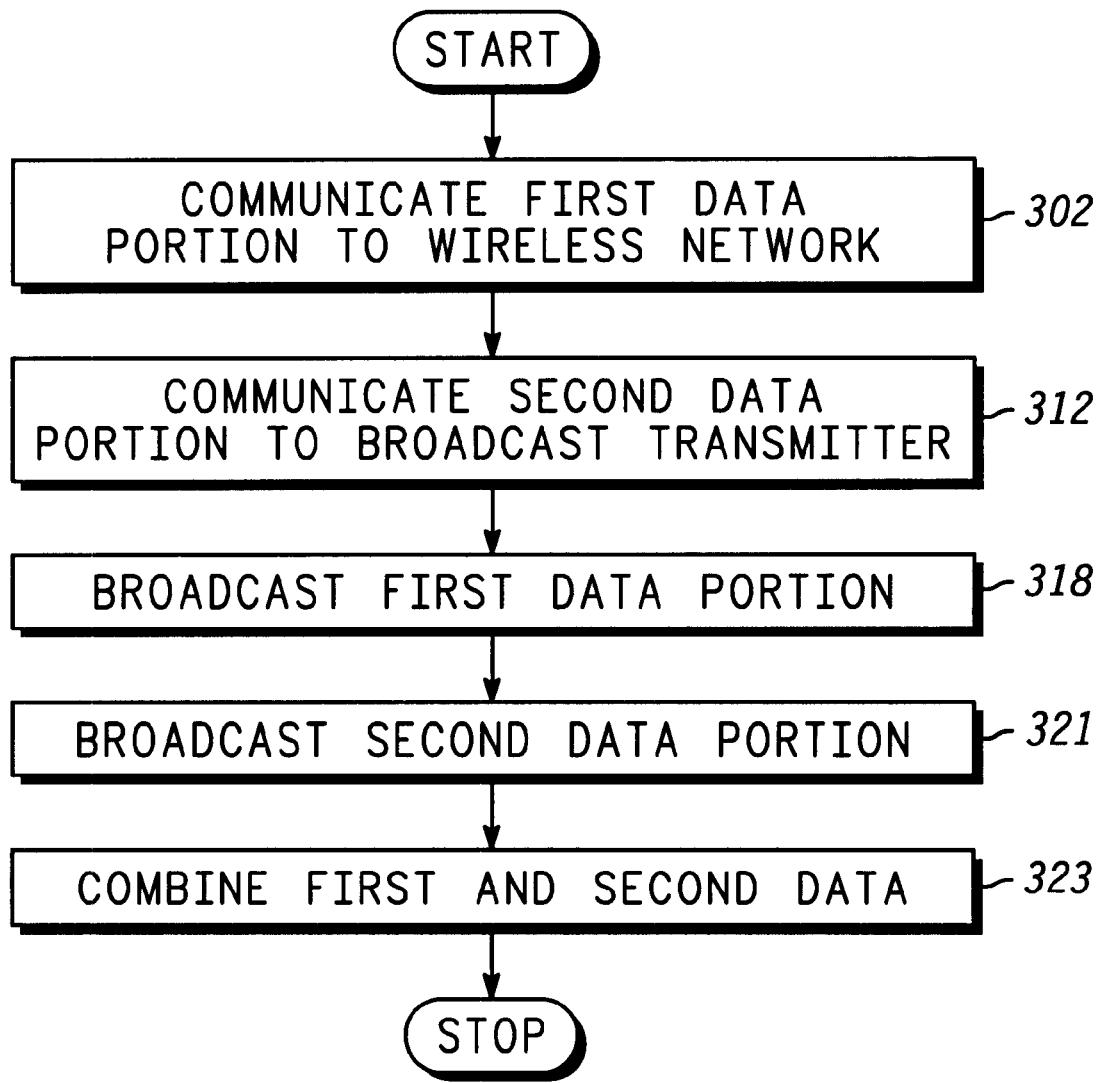
FIG. 3 shows a flow chart of one embodiment of the method of the present invention.

FIG. 3 shows a flow chart 300 of one embodiment of the method of the present invention. In step 302, the gaming server 116 communicates a first digital data portion to the wireless network 209.

As previously discussed, the first digital data portion may be any variety of information, such as information specific to a particular handheld wireless device 202, including for example gaming information, may be general information including scenery or a visual game background, textual information, commands, audio, etc. The first digital data portion may include any type or amount of data.

In step 312, the data server 212 communicates the at least one second digital data portion to the broadcast transmitter 215. The at least one second digital data portion likewise may be any portion of the total digital data. The at least one second digital data portion may be chosen in order to maximize use of the broadcast transmitter bandwidth and minimize the impact of the wireless network bandwidth limitations on the data transfer and/or gaming experience.

In step 318, the wireless network 209 broadcasts the first digital data portion to the plurality of handheld wireless devices 202 through the base stations 206.

In step 321, the broadcast transmitter 215 broadcasts the at least one second digital data portion to the plurality of handheld wireless devices 202. This may or may not be done concurrently with step 318.

As previously discussed, the handheld wireless devices 202 may be capable of also sending information to the base stations 206. This may include, for example, sending digital data to a base station, or may include sending a third digital data portion to the base station and sending at least one fourth digital data portion to a broadcast transmitter.

The digital data information may include game information such as where the player is in a game or a request for information as needed. The data server 212 may use this information in order to generate the first digital data portion and the at least one second digital data portion. In addition, the plurality of handheld wireless devices 202 may transmit data to the broadcast transmitter in order to more directly pass data back to the data server 212.

In step 323, the first digital data portion and the at least one second (and any subsequent) digital data portion are combined in the receiving device (i.e., a handheld wireless device 202). The first and second digital data portions are not merely parallel transmissions of independent data, but are parts of digital data, broken up and separately relayed to facilitate transmission (some data overlap is possible).

It should be noted that in addition to digital data traveling from the data server 212 to the handheld wireless devices 202, data generated in a wireless gaming device 212 may also likewise travel back to the data server 212 using multiple data portions.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A wireless data system, comprising:
   a plurality of handheld wireless devices capable of receiving digital data comprised of a first digital data portion and at least one second digital data portion, a wireless network capable of transmitting said first digital data portion to said plurality of handheld wireless devices;

a data server for creating said digital data, said data server capable of dividing said digital data into said first digital data portion and said second digital data portion and said data server capable of communicating with said wireless network; and at least one broadcast transmitter communicating with said data server, said at least one broadcast transmitter broadcasting said at least one second digital data portion to said plurality of handheld wireless devices;

wherein said plurality of handheld wireless devices are capable of receiving and combining said first digital data portion and said at least one second digital data portion.

2. The wireless data system of claim 1, wherein a handheld wireless device of said plurality of handheld wireless devices comprises a handheld wireless gaming device.

3. The wireless data system of claim 1, wherein said at least one second digital data portion comprises digital data being transmitted to two or more handheld wireless devices.

4. The wireless data system of claim 1, wherein said at least one second digital data portion comprises graphics data.

5. The wireless data system of claim 1, wherein said at least one second digital data portion comprises a visual game background.

6. The wireless data system of claim 1, wherein said broadcast transmitter communicates with said data server via a wire link.

7. The wireless data system of claim 1, wherein said broadcast transmitter communicates with said data server via a RF link.

8. The wireless data system of claim 1, wherein said broadcast transmitter is satellite based.

9. The wireless data system of claim 1, wherein said broadcast transmitter is land based.

10. The wireless data system of claim 1, wherein a handheld wireless device of said plurality of handheld wireless devices transmits a third digital data portion to a base station and at least one fourth digital data portion to at least one broadcast transmitter.

11. The wireless data system of claim 1, wherein said first and second digital data portions are used for a particular application of the handheld wireless device.

12. The wireless data system of claim 1, wherein said handheld wireless device includes a screen to display at least a portion of said first data portion and at least a portion of said second data portion simultaneously.

13. The wireless data system of claim 12, wherein said second data portion provides a visual background for said screen, and said first data portion provides a visual foreground that overlays said visual background on said screen.

14. A method of communicating digital data to a handheld wireless device, comprising the steps of:

dividing said digital data into a first digital data portion and at least one second digital data portion in said data server, said data server communicating with a wireless network and communicating with a broadcast transmitter;

communicating said first digital data portion to said wireless network;

communicating at least one second digital data portion to said broadcast transmitter;

broadcasting said first digital data portion from said wireless network to said handheld wireless device;

broadcasting said at least one second digital data portion from said broadcast transmitter to said handheld wireless device; and combining said first digital data portion and said at least one second digital data portion in said handheld wireless device.

15. The method of claim 14, wherein said method further includes generating said first digital data portion and said at least one second digital data portion in a data server communicating with said wireless network and communicating with said broadcast transmitter.

16. The method of claim 14, wherein said handheld wireless device comprises a handheld wireless gaming device.

17. The method of claim 14, wherein said handheld wireless device comprises a video gaming device.

18. The method of claim 14, wherein said at least one second digital data portion comprises digital data being transmitted to two or more handheld wireless devices.

19. The method of claim 14, wherein said at least one second digital data portion comprises graphics data.

20. The method of claim 14, wherein said at least one second digital data portion broadcast comprises a visual game background.

21. The method of claim 14, wherein said handheld wireless device transmits a third digital data portion to a base station and at least one fourth digital data portion to at least one broadcast transmitter.

22. The method of claim 14, wherein said at least one second data portion is broadcast concurrently with said first digital data portion.

23. The method of claim 14, wherein said at least one second data portion is broadcast non-concurrently with said first digital data portion.

24. A method in a handheld wireless communication device comprising:

receiving a first digital data portion from a first network source;

receiving a second digital data portion from a second network source which is not the first network source, said first digital data portion and said second digital data portion divided at a data server;

reconstructing a signal by combining the first digital data portion and the second digital data portion; and combining said first digital data portion and said second digital data portion.

25. The method of claim 24 wherein the first network is a broadcast network and the second network is a cellular network.

26. The method of claim 25 wherein said first digital data portion is background graphics and said second digital data portion is a foreground overlaid onto said background graphics.

* * * * *